United States Patent [19]

Spencer

[11] 4,292,217
[45] Sep. 29, 1981

[54] CATIONIC AQUEOUS EMULSION SYSTEMS

[75] Inventor: Arthur T. Spencer, New Providence, N.J.

[73] Assignee: Mobil Oil Corporation, New York, N.Y.

[21] Appl. No.: 148,085

[22] Filed: May 12, 1980

Related U.S. Application Data

[60] Continuation of Ser. No. 31,280, Apr. 18, 1979, abandoned, which is a division of Ser. No. 902,596, May 4, 1978, Pat. No. 4,169,080.

[51] Int. Cl.$^3$ .................... C08L 77/06; C08L 91/00
[52] U.S. Cl. ........................ 260/18 N; 260/18 TN; 260/29.2 TN; 260/29.2 N; 525/424; 528/45; 528/68
[58] Field of Search ................ 528/68, 46, 47; 260/18 N, 18 TN; 525/424

[56] References Cited

U.S. PATENT DOCUMENTS

| | | | |
|---|---|---|---|
| 3,020,251 | 2/1962 | Russell | 528/68 |
| 3,523,925 | 8/1970 | Kamal et al. | 528/68 |

*Primary Examiner*—J. Ziegler
*Attorney, Agent, or Firm*—C. A. Huggett; J. F. Powers, Jr.; E. J. Trojnar

[57] ABSTRACT

Water based coatings have been developed comprising water containing dispersed liquid droplets of water immiscible, hydroxy functional organic material, which are emulsified in the water, the water having dispersed therein an amine salt constituted by a salt of a solubilizing acid with a polyamide having a plurality of terminal primary amine groups. About one of the primary amine groups in the polyamide is unsubstituted, and at least about 70% of the isocyanate-reactive amino hydrogen atoms in the polyamide other than in the unsubstituted primary amine group are reacted with one isocyanate group of an organic polyisocyanate, the remaining isocyanate groups of which are blocked by a volatile blocking agent. The blocked isocyanate groups are nonreactive at room temperature and the unblocked isocyanate groups are reactive with the hydroxy functionality of the organic hydroxy functional material at elevated temperature. These coatings can be applied by electrocoating or other more conventional application methods and are curable to hard, flexible, solvent resistant films suitable for use in primer and other coatings applications.

6 Claims, No Drawings

CATIONIC AQUEOUS EMULSION SYSTEMS

CROSS-REFERENCE TO RELATED APPLICATIONS

The present application is a continuation of Ser. No. 031,280 filed Apr. 18, 1979, abandoned, which in turn is a divison of U.S. application Ser. No. 902,596 filed May 4, 1978 for CATIONIC AQUEOUS EMULSION SYSTEMS, now U.S. Pat. No. 4,169,080.

The present invention relates to cationic aqueous emulsion systems which can be used for conventional coating or which can be diluted and electrodeposited at the cathode of a unidirectional electrical system.

Most aqueous cationic systems are of the solution or colloidal dispersion type. In contrast, this invention relates to cationic aqueous emulsion systems which cure by the unblocking of isocyanate groups blocked for stability in the emulsion by a volatile blocking agent.

Emulsion coating systems have various advantages. In conventional coating application, the aqueous systems in which the resins are dissolved or colloidally dispersed are very viscous whenever the resin solids content approaches desirable levels. Emulsion systems possess lower viscosity at higher solids content. Emulsion systems in electrocoat application tend to possess better throwing power and superior flow in the deposited film. This superior flow is the result of the water insoluble organic solvents which are present in the discontinuous phase of the emulsion and which are, hence, electrodeposited with the emulsion droplets. As a result, there are advantages in electrodepositing an emulsion even though the factor of lower viscosity at high solids content is not a factor in an electrocoat system which is normally operated at low solids content. Morever, the replenishment of the electrocoating bath is more easily carried out with an emulsion system since make up emulsion is more easily supplied at higher solids content and the problem of dilution is eased.

In this invention, an aqueous emulsion is provided in which water has emulsified therein liquid droplets of water immiscible, hydroxy-functional organic material, and the water has dispersed therein an amine salt constituted by a salt of a solubilizing acid with a polyamide having a plurality of terminal primary amine groups, about one of which is unsubstituted, and at least about 70% of the isocyanate-reactive amino hydrogen atoms in the polyamide other than in the unsubstituted primary amine group being reacted with one isocyanate group of an organic polyisocyanate. The remaining isocyanate groups of the polyisocyanate being blocked by a volatile blocking agent. This provides blocked isocyanate groups which are nonreactive at room temperature, but when the isocyanate groups unblock at elevated temperature, these unblocked isocyanate groups are reactive with the hydroxy-functionality of the organic hydroxy-functional material to cure the system.

As will be apparent, the emulsion is stored at about room temperature and, after coating application by whatever means is selected, heat is applied to evaporate volatile components and to cause the blocking agent to evaporate, and the isocyanate reaction with active hydrogen atoms serves to provide the desired cure.

While it is broadly possible for the hydroxy-functional organic material to be a nonresinous-organic liquid, such as a propylene oxide adduct of trimethylol propane having a molecular weight of about 750, it is preferred to employ resinous materials which may be low molecular weight organic solvent-soluble polyesters or polyethers. While low molecular weight polyesters, such as the reaction products of succinic acid, adipic or phthalic acid or anhydride, with excess diol, such as 1,4-butylene glycol, or triol, such as trimethylol propane, may be used, resinous polyethers are preferred. These resinous polyethers may be provided by epoxy resin derivatives in which the epoxy group has been consumed by reaction with an acid, a phenol, or an alcohol. Thus, fatty acids like linseed fatty acids can be used via esterification, a phenol like bisphenol A can be used to form an ether, or a fatty alcohol corresponding with a fatty acid can be used to form a more conventional ether.

The preferred polyhydric polyethers are diglycidyl ethers of a bisphenol, such as bisphenol A, having an average molecular weight in the range of about 350 to about 3800, which have been reacted to consume all of the epoxy functionality. In particularly preferred practice, the epoxy resin is reacted with at least about 1 mol of a bisphenol per epoxide equivalent to provide a bisphenol-terminated bisphenol-epichlorohydrin polymer having a molecular weight in the range of about 600 up to about 4000. It will be appreciated that while these bisphenol-epichlorohydrin polymers can be formed by reaction with the diglycidyl ether, one can produce the bisphenol-terminated product directly from the reaction with epichlorohydrin, it being unnecessary, and sometimes uneconomic, to prepare the epoxy-functional intermediate. These bisphenol-epichlorohydrin intermediates and their production are known.

Interestingly, the amine-functional polyamide which is also used, contains amine-functionality which would be reactive with epoxy groups to disrupt the desired bath stability, so it is important that any epoxy groups present be consumed in the production of the hydroxy-functional organic material. Thus, the preferred hydroxy-functional organic materials are oxirane-free hydroxy-functional aromatic polyether-resins which are solid at room temperature and which have a molecular weight up to about 4000, and the most preferred materials are bisphenol-terminated.

Referring to the liquidity of the discontinuous phase of the emulsion, this can be provided by the liquidity of the hydroxy-functional organic material, but an organic solvent of limited water miscibility is preferably used. One reason for this is that it enables the use of hydroxy-functional organic materials which are solid at room temperature. Aromatic hydrocarbons like xylene and toluene are especially preferred, but aliphatic solvents, illustrated by mineral spirits and 2-ethyl hexanol, are also useful. The solvents of limited water miscibility also ease the burden of emulsification, add to emulsion stability, and improve flow on deposition. Thus, such solvents serve many purposes.

The hydroxy-functional organic material is emulsified in the aqueous continuum and conventional nonionic emulsifying agents may be used to assist in the provision of stable emulsions. However, extraneous emulsifying agents are not necessarily needed because the amine salts which are dispersed in the water possess a significant emulsifying capacity.

The amine salts are the reaction product of a solubilizing acid with certain polyamides to be described shortly, but it is here noted that the solubilizing acids are themselves well known for dispersing amine resins in water, so the selection of the acid forms no part of this invention. Acetic acid will be used as illustrative.

The polyamides which are used are selected to have a plurality of terminal primary amine groups. These are conveniently provided by esterifying a polycarboxylic acid, which is preferably dicarboxylic, with one mol per equivalent of carboxyl of a polyamine containing a plurality of terminal primary amine groups. The polycarboxylic acid may vary considerably to include such diverse acids as succinic acid, adipic acid, phthalic acid or mellitic acid, but dimer fatty acids are preferred. These dimer fatty acids are well known and available in commerce and will be illustrated herein using the dimer fatty acid based on linoleic acid.

The polyamines which are used are preferably diprimary amines illustrated by alkylene diamine, like ethylene diamine, or polyalkylene polyamines, like diethylene triamine or triethylene tetramine. The alkylene group conveniently contains from 2-4 carbon atoms, and ethylene is preferred.

In commerce the dimer fatty acids are available pre-reacted with the diprimary diamine, and such materials will be used in the examples.

Organic isocyanates which have a portion of their isocyanate groups blocked with volatile blocking agents are also well known. Toluene diisocyanate is a typical available diisocyanate which will be used as illustrative, and the usual blocking agents are alcohols.

It is stressed that polyisocyanates having all of their isocyanate groups blocked with volatile blocking agents except one are known as a class, and many such materials are described in U.S. Pat. No. 4,017,438.

At least about 70% of the isocyanate-reactive amino hydrogen atoms in the polyamide (other than in the one primary amine group which it is desired to retain unsubstituted) are reacted with the single unblocked isocyanate group of the partially blocked organic polyisocyanate. More preferably at least about 90%, and most preferably, all of the isocyanate-reactive amino hydrogen atoms except the one primary amine group are reacted, and the reaction is a simple addition reaction which proceeds easily at moderate temperature (50°-100° C.). The reaction of amino hydrogen with isocyanate is itself well known.

Reaction of the isocyanate functionality with one primary amine group is prevented by blocking it with ketimine formation. Ketimine formation for this purpose is itself well known, appropriate ketones and reaction conditions being described in said U.S. Pat. No. 4,017,438. In this invention the reaction with ketone is carried out while removing water of condensation until the desired proportion of water of condensation is removed.

As will be apparent, the polyamide containing a plurality of terminal primary amine groups is modified by ketimine formation to block one of the primary amine groups, and all or almost all of the remaining isocyanate-reactive amino hydrogen atoms are reacted with the unblocked isocyanate group in the partially blocked polyisocyanate. The result is that the ketimine-blocked polyamide now carries many blocked isocyanate groups which are nonreactive at room temperature and which unblock on heating to provide unblocked isocyanate groups which are reactive with the hydroxy groups on the hydroxy-functional organic material, and this is the basis for cure.

The ketimine groups come apart upon contact with water so that the primary amine groups are regenerated in the aqueous medium so that they can serve to provide emulsification capacity for the hydroxy-functional organic material which must be emulsified.

As will now be apparent, the polyamide starting material formed by the reaction of polycarboxylic acid with one molar proportion per carboxyl group of amine, having a plurality of primary amine groups has been transformed by reaction with ketone and partially blocked polyisocyanate into a polyamide cross-linking agent which provides a primary amine group in aqueous medium. These primary amine groups enable water dispersibility with the aid of a solubilizing acid, they possess emulsifying capacity, and they are reactive with isocyanate functionality so they participate in the cure.

Dispersion in water and cationic electrodeposition are all conventional and these are illustrated in the examples. All parts herein are by weight unless otherwise specified.

EXAMPLE 1

(Preparation of Half-Blocked Diisocyanate)

A reaction flask is charged with 2592 g of tolylene diisocyanate (commercial mixture containing mostly the 2,4 isomer) and heated to 45° C. under a nitrogen blanket. After removal of the heat source, 1408 g of 2-ethoxyethanol are added over two hours. Cooling is supplied as needed to maintain 50° C.±5° C. The temperature is then allowed to rise to 70° C. and this temperature±2° C. is maintained for two hours.

EXAMPLE 2

(Ketimine Preparation)

A polyamide (2400 g) made by reacting one mole of dimer fatty acid (linoleic) with two moles of diethylene triamine (Versamide 125 constitutes a commercial product available from General Mills which may be used and which constitutes presently preferred practice) and 600 g of methyl isobutyl ketone are charged to a reaction flask and heated under a nitrogen blanket to 110° C. Water of condensation is removed into an overhead water separator until 58 g of water (1 mol of water per mol of polyamide) are collected. The residual ketone is vacuum stripped to provide one ketimine blocked amine group on the starting polyamide which initially contained two primary amine groups and two secondary amine groups. This leaves three isocyanate-reactive amino hydrogen atoms.

EXAMPLE 3

(Reaction of Half-Blocked Polyisocyanate with Ketimine-Blocked Polyamide)

1800 g of the ketimine-blocked polyamide product of Example 2 are heated to 85°-90° C. under a nitrogen blanket in a reaction flask and 303 g toluene and 303 g 2-ethoxyethanol acetate are added during heating. At 75° C. the addition of 1635 g of the half-blocked polyisocyanate of Example 1 is started and heat is removed. Addition is over 60 minutes and cooling is continued to maintain 85°-90° C. The reaction mixture is held at this temperature until no free isocyanate group can be detected using infrared analysis.

EXAMPLE 4

(Production of Amine Salt)

The solution produced in Example 3 at 90° C. has added thereto an organic solvent solution of a chlorinefree bisphenol-terminated bisphenol A-epichlorohydrin polymer having a molecular weight of about 1163 (a number average determined by calculation). On a solids basis, a 50:50 weight ratio of ketimine-blocked polyamide-urea reaction product of Example 3 to a bisphenol-epichlorohydrin polymer is used. The bisphenol-epichlorohydrin polymer solution which is added has a solids content of 50% and the solvents are a mixture of toluene, 2-butoxy ethanol and butanol (weight ratio of 1:1:1). Water is needed to hydrolyze the ketimine groups and thereby release the amine for neutralization and 50 g is ample for this purpose. Acetic acid is then added to fully neutralize the amine functionality. The result is an amine salt-bisphenol polymer-solvent-water mixture which can be diluted with water and agitated to provide an emulsion. Deionized water water is used. The pH is between about 6 and 7.

EXAMPLE 5

At a solids level of 30%, the emulsion of Example 4 can be drawn down on tinplate to provide a wet film having a thickness of about 3 mils. This film is baked for ten minutes at 350° F. to provide a cured film which is strongly adherent to the base and which is hard, clear and resistant to removal by rubbing with a methyl ethyl ketone-saturated cloth.

EXAMPLE 6

At a solids content of 15%, the emulsion of Example 4 is electrodeposited at the cathode using voltages in the range of 150–300 volts. The resin solids electrodeposit uniformly and when the coated cathode is removed, washed with water, and baked as in Example 5, provides a cured film having about the same properties as in said Example 5.

When it is desired to enhance the stability of the emulsion, small amounts of emulsifying agents, such as 0.1–2% by weight of resin solids of a nonionic emulsifying agent can be added. It is also possible to add the unreacted polyamide used in Example 2 in an amount from 2–30%, typically 5% of the weight of the Example 3 reaction product. In either event, emulsion stability is improved.

What is claimed is:

1. A polyamide cross-linking agent adapted to provide the primary amine group in aqueous medium comprising a polyamide having a plurality of terminal primary amine groups, about one of said primary amine groups being ketimine blocked, and at least about 70% of the remaining isocyanate-reactive amino hydrogen atoms in said polyamide being reacted with one isocyanate group of an organic polyisocyanate to form a urea linkage, and the remaining isocyanate groups of said polyisocyanate being blocked with a volatile blocking agent to provide blocked isocyanate groups which are nonreactive at room temperature but which unblock at elevated temperatures.

2. A polyamide cross-linking agent as recited in claim 1 in which said polyamide is the reaction product of a dicarboxylic acid with at least one mole per carboxyl group of a diprimary amine.

3. A polyamide cross-linking agent as recited in claim 2 in which said diprimary amine is an alkylene diamine or polyalkylene polyamine.

4. A polyamide cross-linking agent as recited in claim 3 in which said polyalkylene polyamine is diethylene triamine.

5. A polyamide cross-linking agent as recited in claim 4 in which said dicarboxylic acid is dimer fatty acid.

6. A polyamide cross-linking agent as recited in claim 5 in which said dimer fatty acid is based on linoleic acid.

* * * * *